May 29, 1951     H. G. IRWIN     2,555,088

FISHHOOK BAIT

Filed July 1, 1949

INVENTOR
*Herbert G. Irwin.*

Patented May 29, 1951

2,555,088

UNITED STATES PATENT OFFICE 2,555,088

FISHHOOK BAIT

Herbert G. Irwin, Noble, La.

Application July 1, 1949, Serial No. 102,469

6 Claims. (Cl. 99—3)

This invention relates to artificial fish hook bait, my principal object being to produce a bait of this character especially developed to substitute for natural fish bait, but which may not necessarily simulate any form of animal life.

Another object of the invention is the production of an artificial fish hook bait which is attractive to fish having daytime feeding habits and locate their food primarily by sight.

A further object of the invention is the production of an artificial fish hook bait attractive to bottom feeding and night feeding fish which locate their food by scent as well as by sight.

Another object of the invention is the production of an artificial fish hook bait capable of easy impalement upon a fish hook.

A further object of the invention is the production of an artificial fish hook bait capable of clinging to the fish hook upon which it is transfixed.

Other objects and advantages of the invention will appear throughout the following specification and claims.

Figure 1:
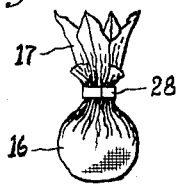
Figure 1 is a side elevational view of a bulb shaped fish hook bait constructed in accordance with the invention.
Figure 2:
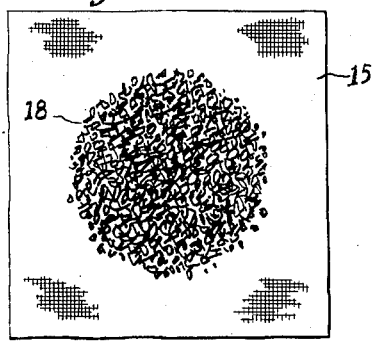
Figure 2 is a plan view of a cloth bag blank with a charge of bait material placed thereon.
Figure 3:
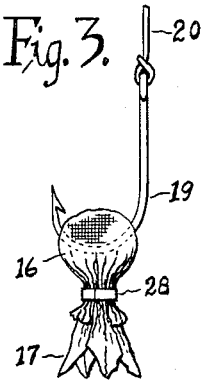
Figure 3 is a side view in plan of the form of bait shown in Figure 1 transfixed upon a fish hook.

Upon reference to Figure 1 of the drawings it will be noted that 16 indicates a bound bulb shaped cloth bag having an appendage 17. A quantity of bait material having a scent which is attractive to the food detective senses of one or more types of game fish is inclosed in the bag 16. The bag 16 with the appendage 17 is formed of a sized blank of cloth, a square blank of woven cotton cloth such as 15 shown in Figure 2 being preferred. In forming the bag 16 and inclosing the bait material therein, the outer marginal edges of the cloth blank 15 are gathered up in numerous small radial folds and the central portion of the blank is curved spherically around the measured charge of divided bait material 18 which is placed in the center of the bag blank. The folded marginal edges of the blank 15 are bunched together to close the bag 16 and form the appendage 17. The appendage 17 and the bag 16 are bound with a suitable binder which is placed around the base of the appendage and the opening of the bag, a metal band ring binder 28 being shown crimped in place in Figure 1. In Figure 3 the bait with the appendage is shown transfixed upon a fish hook 19 which is attached to a leader or line 20. The bait with the appendage is used on a fish hook attached to a line or leader in casting and trolling for fish. If preferred, the bait with the appendage may be used on a fish hook equipped with a spinner or wiggler in casting and trolling operations in pursuit of game fish. The bait clings well to a fish hook and is attractive to game fish having daytime feeding habits and locate their food primarily by sight. The scent of the inclosed bait material assists in enticing fish to seize the bait. In fishing with the bait, a small quantity of water working into and out of the bag at the puncture made by the fish hook carries tasty juices of the bait material out of the bag by degrees which gives an approaching fish a smell of the bait.

Figure 4:
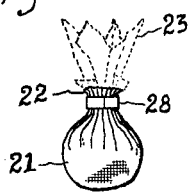
Figure 4 is a side elevational view of a bulb shaped fish hook bait showing modification in practicing the invention.
Figure 5:
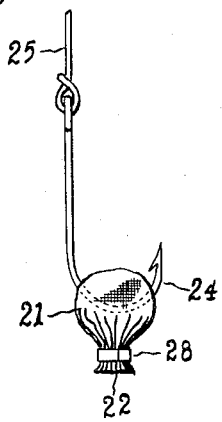
Figure 5 is a side view in plan of the form of bait shown in Figure 4 transfixed upon a fish hook.
Figure 7:
Figure 7 is an edge plan view of the band ring binder initially curved in a bending operation on a blank such as shown in Figure 6.
Figure 8:
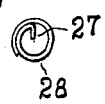
Figure 8 is an edge plan view of the band ring binder crimped to its closed position.

The bait without an appendage shown in Figure 4 is used mainly on hooks in stillfishing and used on set hooks and trotline hooks for catching game fish which locate their food by scent as well as by sight such as catfish and other types of bottom feeding fish. The cloth bag 21 is distended by an inclosed charge of bait material and the bag is bound securely closed with a suitable binder, the metal band ring form of binder 28 being shown. The bag 21 is formed of a sized blank of cloth which is curved spherically around a measured charge of bait material and bound. In filling and binding the bag, the bait material is placed in the depressed center of the bag blank and the gathered marginal edges of the blank are bunched together in numerous radial folds to close the bag and form the neck 22 on which an open binder such as 28 of Figure 7 is placed close to the bag 21 and crimped securely closed as shown in Figures 4 and 8. If preferred, the projecting end portion of the neck which is shown in broken lines 23 may be cut off near the binder. In Figure 5 the bait without an appendage is shown transfixed upon a fish hook 24 which is attached to a line 25.

Figure 6:
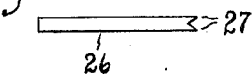
Figure 6 is a plan view of a flat metal blank of which the band ring binder is formed.

The metal band ring binder 28 shown in the closed position in Figures 1, 3, 4, 5 and 8 is initially curved to approximately the shape shown in Figure 7 which is open enough for convenient application to the neck of the bag to be crimped closed with the aid of a suitable tool. The binder 28 is initially formed as shown in Figure 7 by curving a flat metal blank such as 26 shown in Figure 6. The blank 26 with one end notched to form teeth 27 is cut from stock of tin coated sheet iron or sheet aluminum or other suitable sheet or strip metal material. In bending the blank 26 to the approximate shape shown in Figure 7 the notched end 27 is angled laterally and permanently to project inwardly of the ring to bite into the folded cloth when the binder is finally crimped in its place on the bag. The inwardly projecting notched end or teeth 27 assists in preventing the binder from slipping out of place after it is crimped closed on the bag.

Figure 9:
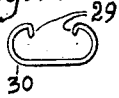
Figure 9 is a plan view of an initially curved wire ring binder which is also employed in practicing the invention.
Figure 10:
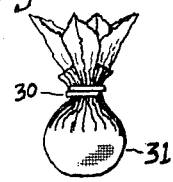
Figure 10 is a side elevational view of a bulb shaped fish hook bait bound with a wire ring binder.

The initially formed wire ring binder 30 shown in Figure 9 has its two ends 29 and 29 angled inwardly to bite into the bunched folds of the bag when the binder is finally crimped closed in place on a bag such as 31 shown in Fig. 10. The inwardly projecting ends 29 of the binder 30 assist in preventing the binder from slipping out of place after it is crimped closed on the bag.

Figure 11:
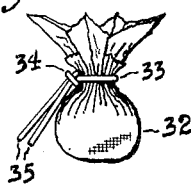
Figure 11 is a side elevational view of a bulb shaped fish hook bait bound with a string binder.

If preferred, the bait may be made up with a string binder. The use of a string binder is shown in Figure 11 wherein the string 33 is shown looped and drawn tightly around the neck of the bag 32 and secured with a fast hitch or knot 34. The loose ends 35 of the tied string may be left extending somewhat from the knot 34 to dangle or wiggle in running water and thereby assist in ocular attraction. A string 33 having a color which will contrast sharply with the color of the cloth of which the bag 32 is made may be used to advantage.

Figure 12:
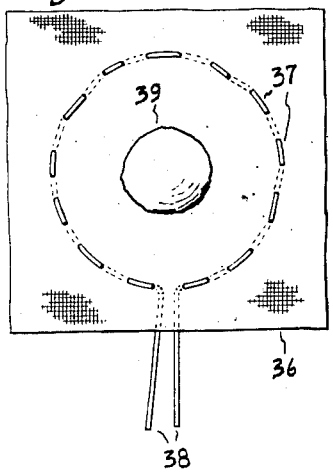
Figure 12 is a plan view of a cloth bag blank laced with a draw-string binder. A ball of bait material being shown placed on the blank.

The use of a drawstring for closing and binding the bag is shown in Figure 12. The drawstring 37 is laced in the bag blank 36 around the central portion thereof with a darning needle. In working the laced blank 36 into a bag and inclosing bait material therein, the central portion of the blank is curved spherically into a bag around a measured charge of divided bait material or a sized lump or ball of bait material, a sized ball of bait material 39 being shown, and both ends 38 of the drawstring 37 are drawn outwardly to close the bag and inclose the bait material. The numerous folds of the bag blank which form on the drawstring as it is drawn tightly to close the bag securely are bunched into a small loop of the drawstring and the drawstring is tied securely with a suitable knot. If preferred, the lengthy free end portions of the drawn and tied drawstring may be used to form one or more half-hitch loops around the neck of the bag.

Woven cotton cloth permeable to water is preferred for the bag material, although, woven, knitted or braided cloth of cotton, linen, silk or washable cloth of synthetic fibers or threads may be used for the bag material. In producing a bait capable of easy impalement upon a fish hook, openly woven, knitted or braided cloth is used for the bag material and coarse bait material is used for the bag filler. Starch or sizing is not especially desirable in the bag material, but may be tolerated when not repulsive to the senses of game fish. Cloth treated with a waterproofing substance or cloth treated to resist mildew or treated to repel moths are not recommended and cloth treated with any substance that is repulsive to the senses of game fish is not desirable for use as bag material. The bag material may be any solid color that is attractive to game fish or have any figure or color design or pattern of colors that is attractive to game fish. Some attractive solid colors in cotton cloth available on the market at the present time are, for example, white, cream; and vat-dyed yellow, green, red and black. Some attractively figured or printed cloth are, for example, red or black dots on a white field; small checks of white and red or white and black; red or black parallel lines or narrow stripes spaced with white.

A variety of bait materials are available for inclosing in the bag. Some bait materials attractive to the food detective senses of one or more types of game fish and available on the market in a dry state and divided form are, for example, fish meal made of air dried fish scrap; slaughterhouse meat scrap tankage; dried slaughterhouse blood; dried egg; dried milk solids; dehydrated milk. Other dry divided bait materials may be made by grinding and drying tripe, beef liver, heart, kidney, fish, shrimp, squid or any meat or meaty substance which is attractive to the food detective senses of one or more types of game fish.

Dry divided bait material that expands somewhat upon absorbing water is inclosed in the bait bag with enough space to accommodate the expansion which occurs when the bait is put in water as in use. A bait bag carrying a charge of dry divided bait material and expansion space has a flabby appearance until submerged in water for a period of time as in use on a fish hook for bait.

Fish meal, tankage or fermented milk curds having a rank odor may be used as a scenting agent in making up compound bait materials. Other scenting agents are, for example, oil of anise, fish oil, horse oil. If preferred, animal or fish gelatine, egg or albumin, gum arabic, agar, tapioca, finely ground corn, barley, rice or wheat may be used as a colloid or binding agent or vehicle in compound bait materials.

A simple dry compound bait material may be made by mixing together 50 percent rice size dried domestic hen egg and 50 percent fish meal. This bait material may be inclosed in a bag made of plain or figured muslin or domestic cloth having about 50 threads each way per inch when intended for still fishing or about 60 threads each way per inch when intended for troll fishing.

Some raw bait materials are, for example, lumped or ground raw tripe, beef liver, kidney, heart, fish, shrimp, squid, fermented milk curds. Bait bags carrying raw bait material may be packed in suitable containers and kept in cold storage until they are to be used. If preferred, bait bags of white or stable color carrying raw bait material such as raw tripe or fish may be packed in cans and preserved for future use by the process commonly employed in canning Vienna sausage or sardines.

A raw compound bait material may be made by mixing together a quantity of any two or more ground raw bait materials and including a scenting and/or binding agent if desired.

A bait material may be made of a soft or spongy dry absorbent and a liquid scenting agent, for example, a sized piece of sponge or a mass of hair or wool impregnated with fish oil or a liquid compound attractive to the food detective senses of one or more types of game fish. If preferred, a sized mass of linters may be used for the bag filler and absorbent for holding a quantity of liquid scenting agent and the scenting agent may be added to the linters after the linters are bagged. A liquid scenting agent may be introduced into the bagged linters by hypodermic injection or dipping either before or after transfixing the bag of linters on a fish hook. If preferred, the liquid scenting agent may be applied on the filled and bound bag with a medicine dropper or by dipping by the fisherman.

I claim:

1. An artificial fish hook bait consisting of a bound bulb shaped cloth bag carrying inclosed therein a mass of bait material having a scent attractive to the food detective senses of one or more types of game fish, said bag having a closed neck including bunched folds of cloth embraced by a binder.

2. An artificial fish hook bait consisting of a bound bulb shaped cloth bag carrying inclosed therein a quantity of divided bait material having a scent attractive to the food detective senses of one or more types of game fish, said bag having a closed neck including bunched folds of cloth embraced by a binder.

3. An artificial fish hook bait consisting of a bound bulb shaped cloth bag carrying inclosed therein a mass of bait material having a scent attractive to the food detective senses of one or more types of game fish, said bag having a closed neck including bunched folds of cloth embraced by a binder, and an appendage extending from said neck.

4. An artificial fish hook bait consisting of a bound bulb shaped cloth bag carrying inclosed therein a quantity of divided bait material having a scent attractive to one or more types of game fish, said bag having a closed neck including bunched folds of cloth embraced by a binder, and an appendage extending from said neck.

5. An artificial fish hook bait consisting of a bound bulb shaped cloth bag carrying inclosed therein an absorbent fiber filler for receiving a hypodermic injection of a scenting agent preparatory to use, said bag having a closed neck including bunched folds of cloth embraced by a binder, and an appendage extending from said neck.

6. An artificial fish hook bait consisting of a bound bulb shaped cloth bag carrying inclosed therein a dry absorbent filler for absorbing a portion of a liquid scenting agent applied on the bag preparatory to use, said bag having a closed neck including bunched folds of cloth embraced by a binder.

HERBERT G. IRWIN.

REFERENCES CITED

The following references are of record in the file of this patent:

UNITED STATES PATENTS

| Number | Name | Date |
|---|---|---|
| 871,935 | Henzel | Nov. 26, 1907 |
| 1,185,894 | Evans | June 6, 1916 |
| 1,291,614 | Noxon | Jan. 14, 1919 |
| 1,366,509 | Thiessen | Jan. 25, 1921 |